June 7, 1960  J. R. CONYERS  2,939,281
FLOW CONTROLLING VALVE SYSTEM
Filed March 1, 1954

INVENTOR.
JOHN R. CONYERS
BY
*William R Lane*
ATTORNEY

United States Patent Office 2,939,281
Patented June 7, 1960

2,939,281

FLOW CONTROLLING VALVE SYSTEM

John R. Conyers, Reseda, Calif., assignor to
North American Aviation, Inc.

Filed Mar. 1, 1954, Ser. No. 413,045

12 Claims. (Cl. 60—39.48)

This invention relates to a valve system for controlling the flow of a liquid or gas. The invention more particularly relates to the provision of a valve system for controlling the flow of propellants into the combustion chamber of a rocket engine.

Designs of small rocket engines have incorporated therein a gas or air-pressurized propellant feed system for delivery of an oxidizer and the fuel to the injector of the rocket engine thrust chamber. In a pressurized feed system, a pressurizing means, which is normally a gas generator of the igniter or self-contained type, pressurizes the propellants in the propellent tanks and causes a flow of the propellants therein to an injector which injects the propellants into the combustion chamber of the rocket engine. For simplicity and weight-saving reasons, many of these rocket engines have included normally sealed valves which are essentially burst diaphragms between the propellent tank and the injector. These diaphragms are designed and calibrated to rupture by propellent pressure at a value safely above any storage tank pressure which could be caused by the initial filling of the tanks and changes in volume of the tank liquids due to an increase in ambient temperature. Thus, the propellant tanks are at times under a relatively high pressure in the pre-firing condition. This pre-firing condition in a propellent tank necessitates undesirably high rupture strength in the burst diaphragms of the propellent feed lines. When the firing sequence is initiated in these systems the pressurizing medium has to build up the propellent pressure to an undesirable high value in order to open the burst diaphragms. A surge of propellants is then injected into the combustion chamber and an excessive amount accumulates before combustion is sufficiently advanced to handle it.

Another undesirable result of using these previous high-pressure burst diaphragms is the non-uniform opening of one propellent line in relation to the other. This results in an "off" mixture ratio at the start of the engine and an unintended oxidizer or fuel lead in the combustion process.

The many difficulties inherent in prior rocket valve systems are overcome by the instant invention. A pressure-actuated valve is provided which will support a low-strength burst diaphragm against rupture until the opening operation is scheduled in the starting sequence. During all pre-firing conditions, the low-strength burst diaphragm is protected from rupture by having a support positioned behind it. A flow of the pressurizing medium is utilized to remove the support behind the burst diaphragm in order that the diaphragm will be able to rupture and open at a comparatively low propellant pressure. Thus, the propellant does not surge as it enters the combustion chamber, but the flow and pressure is permitted to start at a low value and to increase progressively.

The present invention in its specific aspects allows a rocket engine to make a so-called "soft start." Basically, the soft start is the attainment of ignition and the rise to operational chamber pressure without an excessive pressure surge or detonation taking place in the combustion chamber. The dominating requirement for a soft start is to initiate the flow of propellant through the injector at a minimum rate and pressure which will start a reliable ignition, and then to smoothly increase the flow rate and pressure of the propellants until full thrust chamber combustion is realized.

A principal object of this invention is to obtain a new and novel flow-controlling valve system.

A further object of this invention is to provide a valve system for conducting a liquid or gas to an injector.

A still further object of this invention is to provide a low pressure burst valve system which will withstand high pressure when the burst valve is supported by a sliding member.

A further object of this invention is to provide for a "soft start" in a rocket power plant.

An object of this invention is to provide a means for employing a low-strength burst diaphragm in a propellent feed line.

A further object of this invention is to provide improved control of the propellent flow into a rocket power plant by the utilization of the action of gas pressure on a large-diameter, piston-type injector.

A still further object of this invention is to provide a sliding injector assembly as a sliding support in back of low pressure burst diaphragms.

Another object of this invention is to provide a smooth starting rocket engine.

A further object of this invention is to provide a smooth starting rocket engine which will incorporate a transitional combustion stage.

A still further object of this invention is to provide means to protect low rupture pressure diaphragms from bursting at high pressures under non-operating conditions.

Other objects of invention will become apparent from the following description taken in connection with the accompanying drawings, in which Fig. 1 represents the general valve system for controlling a liquid or gas flow;

Figure 1:
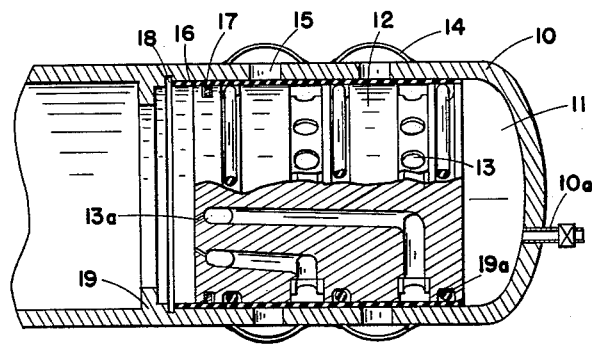

The flow controlling valve system illustrated in Fig. 1 comprises a rigid cylindrical casing member 10 having peripheral openings 15 therein and a piston slidable within said cylindrical casing member. The piston member serves as an injector to inject a fluid or gas into a desired chamber. The injector comprises a support portion 12 and an entrance portion 13. The support portion 12 is of solid material, while the entrance portion 13 comprises a series of liquid conducting ports or grooves leading to injector nozzles 13a. Suitable means 19a are provided for slidingly sealing the injector with respect to the cylindrical member. Situated between and in abutting relationship with the interior periphery of the apertures 15 and the solid portion 12 of the injector is a thin shell member 16 which functions as a normally closed valve or burst diaphragm. In pre-operating position the thin shell member or burst diaphragm 16 is supported by the support portion 12 in proximity to and juxtaposition with the peripheral apertures 15. The thin shell member or burst diaphragm 16 has a relatively low rupture strength. By reason of the support 12 being placed in abutting relationship behind the diaphragm 16, the diaphragm is able to withstand pressures greater than its calibrated burst strength.

Fig. 1 further shows conduit means 14 through which a pressurizing means acts against the burst diaphragm 16. In the case of rocket installations, pressure on the propellants themselves cause the propellants to flow through channels 14 and create a pressure through the openings 15 and against the burst diaphragm 16. In normal operation, the low pressure burst diaphragm can withstand relatively high pressures because of the presence of the supporting member behind the burst diaphragm.

When it is desired that the normally closed valve be opened, pressurized gas is introduced into the space 11 through conduit and valve means 10a above the injector piston. This pressurized gas forces the piston to move with respect to the cylindrical member, removing the support portion of the piston from in back of the diaphragm where the diaphragm is in juxtaposition with the opening 15. A positive stop means 19 is provided to limit travel of said injector. Likewise, a mechanical detent and groove combination 17, 18 is provided to lock the piston with respect to the cylindrical member at its bottom point of travel. At this bottom point, the ports in the entrance portions 13 of the injector are opposite the openings 15 and are in juxtaposition with the burst diaphragm 16 at that point. In this locked position the injector is positioned to inject a predetermined rate of flow into an associated chamber. In rocket applications, this associated chamber would be the combustion or thrust chamber. The means to pressurize the space 11 and means to pressurize the liquid or gas which flows through the conduit 14, the openings 15 and burst diaphragm 16, when the injector is in the bottom position, may be a common pressurizing means. A suitable pressurizing means may be seen in Fig. 3 as explained below.

Figure 2:
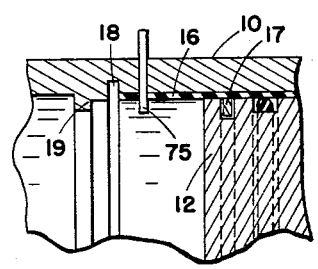
Fig. 2 shows an intermediate locking device for stepwise valve control of a liquid or gas flow.

Fig. 2 illustrates an intermediate locking device for step-wise valve control of the fluid flow into the injector and thrust chamber. In this modification, a shear pin or other restraining device 75 is placed in the path of the injector 12, 13 sliding with respect to the cylindrical member 10. This will allow only a partial juxtaposition of the entrance portions 13 and the peripheral openings 15 and result in a partial combustion rate in the thrust chamber. As the pressure in the feed system and in the space 11 (Fig. 1) increases to a predetermined amount the shear pin or restraining means 75 fails and the injector continues its movement until it abuts limit stop 19 while simultaneously putting the entrance portions 13 and openings 15 in juxtaposition and locking the piston injector with respect to the cylindrical member 10. In Fig. 2 the locking is accomplished by a split ring 17 expanding into the groove 18.

Figure 3:
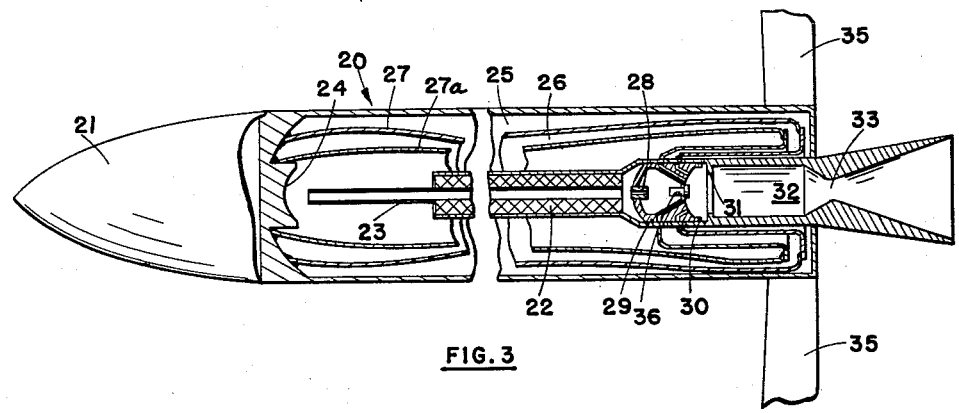
Fig. 3 represents the use of a specific valve system in a rocket.

Fig. 3 shows a specific use of the flow controlling valve invention. The rocket 20 illustrated in Fig. 3 includes a warhead 21, an igniter or other type gas generator 22, a pressure exhaust tube 23, a deflector portion 24, propellent tanks 25 and 26 separated by a flexible wall 27, an injector assembly 29, locking and abutting means 30, 31 for the sliding injector 29, a combustion or thrust chamber 32, a throat section 33, and an exhaust and tail assembly 34, 35. In operation, when the igniter 22 is fired, pressurizing gases traveling down the tube 23 are deflected by the deflector 24, force a flexible membrane 27a outwardly, and act to pressurize the propellants in the propellent tanks 25 and 26. A flexible wall 27 separates the propellent tank section 25, 26 and enables a common pressurizing means to pressurize both tank sections. Simultaneously, with the emission of pressurizing gas down the tube 23, pressurizing gas also travels through aperture 28 and forces the sliding injector in an aft direction. This action removes the supports from the injector burst diaphragms, explained with respect to Fig. 4 below, and allows injection of the pressurized propellants into the thrust chamber 32.

Figure 4:
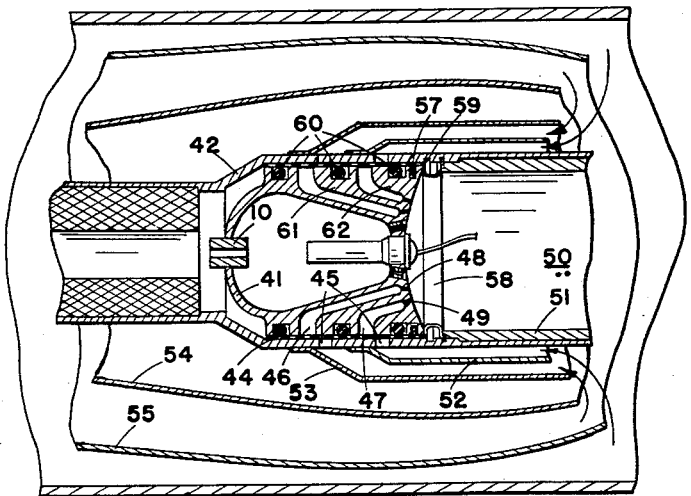
Fig. 4 represents a detailed view of the valve system of Fig. 3.

Fig. 4 is a detailed view of the invention in its specific aspects as related to use in rocket construction. The valve system illustrated in Fig. 4 comprises a sliding injector 41, having support portions 61 and 62 and entrance portions 46 and 47. The injector 41 slides within a rigid cylindrical member 42 and is slidingly sealed therewith by means 60. A thin shell member or burst diaphragm 44 is provided between the injector 41 and the cylindrical member 42. The burst diaphragm 44 as illustrated provides normally-closed valves across the peripheral openings 45 and the cylindrical member 42. In normal pre-firing operation, the support portions 61 and 62 of the injector abuts against the burst diaphragm 44 at a point in juxtaposition with both the burst diaphragm 44 and the openings 45. In prefiring operation, pressures developed in various propellent tank sections, separated by walls 54 and 55, and transmitting pressures to the openings 45 by channels formed by barriers 52 and 53, are prevented from bursting the thin shell member 44 by reason of the supports 61 and 62 abutting the rear of such shell member at the area of the peripheral apertures 45.

At the start of the firing sequence, the piston-like injector 41 is slid in an aft direction compressing a compressible ring 58 and bringing the entrance portions or grooves 46 and 47 into juxtaposition with the peripheral openings 45. As the ring 58 is compressed to a full extent, a mechanical detent means, such as a spring split ring 57, falls into a groove 59, to effectively lock the injector 41 with respect to the cylindrical member 42. Simultaneously with this action, the removal of the support portions 61 and 62 from behind the burst diaphragms in proximity to the openings 45 allows such burst diaphragms to burst, and allows flow of the liquid propellants through the entrance portions 46 and 47 and into the injector nozzles 48 and 49. Fuel and oxidizer are typically injected into the area 50 of the combustion chamber 51 and the resultant gases are expelled through the throat sections aft of the chamber 51 and provide the necessary thrust for the rocket. This action can be seen in Fig. 3.

The valve systems described in Fig. 1 and Fig. 4 incorporate a two-position sliding injector. It is further contemplated by this invention that a transitional or intermediate stage in the build-up of combustion action is possible by providing an intermediate lock in the sliding motion of the injector wherein the openings 45 and the flow ports in the entrance portions of the injector are only partially lined up. This modification is basically illustrated in Fig. 2. Thus, the shearing action or bursting action of the normally-closed valves can only be partially completed, and hence only partial flow of liquid or gas to the injector can take place.

The above set out invention is not limited to valve systems for controlling propellent flow to rockets. The valve system may be used to control the flow of a liquid or a gas to a liquid reactant gas generator system or power unit, or to any other demand for a normally-closed valve system, with ability to hold high pressures, yet able to be opened by pneumatically or hydraulically actuated devices to deliver a flow of liquid or gas which builds up from the initial pressure in the valve system.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A flow-controlling valve system comprising a rigid casing member having at least one opening therein, means to conduct a flow of fluid through the opening, a burstable diaphragm closing the opening, a slidable injector within said casing member and having a solid support portion and an entrance portion, said solid portion being positioned to normally abut against said diaphragm and associated opening, said injector being slidable into a position whereby the support portion is removed from abutment with said diaphragm and the entrance portion is in juxtaposition with said opening, and pressurizing means for bursting said diaphragm and to allow flow of fluid from said first-mentioned means to said injector.

2. A flow-controlling valve system comprising a cylindrical casing member having at least one opening therein, a sliding injector member within said casing member and having a support portion and an entrance portion, a diaphragm member disposed between the casing opening and the support portion of said injector member, means to move said injector so that the entrance portion is in juxtaposition with said opening and the support portion is removed from juxtaposition with said opening and diaphragm, and means to burst said diaphragm when said injector support portion is removed therefrom.

3. The invention as claimed in claim 2 in which the last two mentioned means are a common pressure means.

4. The invention as claimed in claim 2 in which a locking means is provided for locking said injector with respect to said casing member after the support portion has been removed from juxtaposition with said opening and diaphragm.

5. In a rocket engine having a pressurized propellant feed system and thrust chamber, at least one propellant tank, a rigid cylindrical member having at least one opening in the periphery thereof leading to said tank, a sliding injector having a support portion and an entrance portion, a thin shell member situated between and abutting the support portion of the injector and the peripheral opening in the cylindrical member, and means to slide said injector with respect to the cylindrical member and to thereby remove the support portion thereof from juxtaposition with said opening and from supporting the thin shell member at said opening, said mean sliding said injector to a position wherein said entrance portion is opposite said peripheral opening.

6. The invention as claimed in claim 5 in which a means to pressurize the propellant tank is provided, which means further functions to slide the injector.

7. The invention as claimed in claim 6 in which a means is provided to lock the injector with respect to the cylindrical member when the entrance portion of the injector is opposite the peripheral opening.

8. The invention as claimed in claim 6 in which the pressurizing means bursts the thin shell member when the support portion of the injector is removed from juxtaposition with the peripheral opening and the shell member.

9. In a pressurized fluid feed system, a rigid cylindrical casing member having a plurality of openings around the periphery thereof, a piston-like injector, having support portions and grooved entrance portions, within the casing member, a thin cylindrical shell member disposed between and abutting the openings and the support portions of the injector, means to remove said support portions from abutting relation with said shell holder at said openings, said last-mentioned means moving said entrance portions into juxtaposition with said openings, and locking means to lock said injector with respect to the casing member when said entrance portions are in juxtaposition with said openings, said thin cylindrical shell member being adapted to burst at low pressures when the support portions of said injector are removed from juxatposition with said peripheral openings.

10. The invention as claimed in claim 9 in which an intermediate restraining means is provided to allow partial juxtaposition of both said support portions and said entrance portions with said peripheral openings.

11. A flow-controlling valve system comprising a cylindrical member having at least one opening in the periphery thereof, a piston member slidable within said cylindrical member, a normally sealed valve abutting and between said opening and a peripheral surface of said piston, said piston being slidable to remove at least part of the peripheral surface thereof from abutting relation with the valve at the area of the peripheral opening, and pressure means to open said valve when said piston has been moved.

12. The invention as claimed in claim 11 in which the pressure means moves said piston, opens said valve, and controls the flow of a liquid through said opening, said valve and into said piston.

References Cited in the file of this patent

UNITED STATES PATENTS

| | | |
|---|---|---|
| 1,863,455 | Rowley | June 14, 1932 |
| 2,502,886 | Ragan | Apr. 4, 1950 |
| 2,671,312 | Roy | Mar. 9, 1954 |